US008527614B2

(12) United States Patent
Vulugundam (10) Patent No.: US 8,527,614 B2
(45) Date of Patent: Sep. 3, 2013

(54) METHOD OF DEPLOYMENT OF REMOTE PATCHES TO BUSINESS OFFICE APPLIANCES

(75) Inventor: Revathi Vulugundam, Cupertino, CA (US)

(73) Assignee: Ricoh Company, Ltd., Ohta-ku, Tokyo (JP)

(*) Notice: Subject to any disclaimer, the term of this patent is extended or adjusted under 35 U.S.C. 154(b) by 901 days.

(21) Appl. No.: 12/247,176

(22) Filed: Oct. 7, 2008

(65) Prior Publication Data

US 2010/0088693 A1    Apr. 8, 2010

(51) Int. Cl.
G06F 15/177    (2006.01)
G06F 15/16     (2006.01)
G06F 9/44      (2006.01)

(52) U.S. Cl.
USPC ............................ 709/221; 709/206; 717/168

(58) Field of Classification Search
USPC ................. 709/206, 221; 717/168–173
See application file for complete search history.

(56) References Cited

U.S. PATENT DOCUMENTS

| 6,915,342 B1 | 7/2005 | Motoyama |
| 7,334,224 B2 | 2/2008 | Haga |
| 7,631,350 B2 | 12/2009 | Parry |
| 2001/0028465 A1 | 10/2001 | Sugino |
| 2002/0087961 A1* | 7/2002 | Dorricott ...................... 717/168 |
| 2002/0199173 A1 | 12/2002 | Bowen |
| 2003/0022186 A1 | 1/2003 | Bates et al. |
| 2003/0122871 A1 | 7/2003 | Darlet et al. |
| 2003/0177421 A1 | 9/2003 | Baker et al. |
| 2004/0049552 A1* | 3/2004 | Motoyama et al. ........... 709/208 |
| 2004/0093598 A1* | 5/2004 | Haga et al. ..................... 717/173 |
| 2004/0184467 A1 | 9/2004 | Watanabe |
| 2004/0215706 A1 | 10/2004 | Lavender et al. |
| 2005/0132349 A1* | 6/2005 | Roberts et al. ................. 717/168 |
| 2005/0216895 A1 | 9/2005 | Tran |
| 2005/0257214 A1* | 11/2005 | Moshir et al. .................. 717/171 |
| 2005/0275867 A1 | 12/2005 | Higashiura et al. |
| 2006/0026434 A1 | 2/2006 | Yoshida et al. |
| 2006/0066995 A1 | 3/2006 | Mukund et al. |
| 2006/0078346 A1 | 4/2006 | Lovat et al. |

(Continued)

FOREIGN PATENT DOCUMENTS

| JP | H 06-222956 | 8/1994 |
| JP | H 09-325927 | 12/1997 |

(Continued)

OTHER PUBLICATIONS

Stallman et al., "Debugging with GDB", downloaded from the internet archive at URL, http://wweb.archive.org/web/20060510224136:///www.gnuarm.com/pdf/gdb.pdf>, dated May 10, 2006, 5 pages.

*Primary Examiner* — Jeong S Park
(74) *Attorney, Agent, or Firm* — Hickman Palermo Truong Becker Bingham Wong LLP (57) ABSTRACT

Software configuration and status information of one or more business office appliances operating behind a firewall are controlled remotely by a software patch management application. The software patch management application is connected to a network and transmits instructions and software patches via electronic mail to a network connection on the other side of the firewall. A device management application receives the instructions and/or software patches and communicates the instructions and/or software patches to one or more business office appliances for execution and/or installation without requiring re-boot of the business office appliances.

20 Claims, 9 Drawing Sheets

(56) References Cited

U.S. PATENT DOCUMENTS

| | | |
|---|---|---|
| 2007/0162460 A1* | 7/2007 | Long .............................. 707/10 |
| 2008/0005733 A1* | 1/2008 | Ramachandran et al. .... 717/168 |
| 2008/0085741 A1 | 4/2008 | Tauberman et al. |
| 2008/0127115 A1* | 5/2008 | Bystricky et al. ............. 717/130 |
| 2009/0119681 A1* | 5/2009 | Bhogal et al. ................ 719/318 |
| 2009/0316175 A1 | 12/2009 | Wang |
| 2010/0085597 A1 | 4/2010 | Vulugundam |
| 2010/0220358 A1 | 9/2010 | Beninato et al. |

FOREIGN PATENT DOCUMENTS

| | | |
|---|---|---|
| JP | 2003084982 A | 3/2003 |
| JP | 2003233512 A | 8/2003 |
| JP | 2003-276284 A | 9/2003 |
| JP | 2003296132 A | 10/2003 |
| JP | 2004194284 A | 7/2004 |
| JP | 2008062582 A | 3/2008 |

* cited by examiner

METHOD OF DEPLOYMENT OF REMOTE PATCHES TO BUSINESS OFFICE APPLIANCES

FIELD OF THE INVENTION

This invention relates generally to the copying, printing, scanning and facsimile transmission of documents. In particular, this invention relates to the deployment of remote patches on a business office appliance such as a multi-function peripheral.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The use of business office appliances has proliferated as offices have become more automated and less dependent on manual devices. The term "business office appliance" as used herein may refer broadly to any device configured to create electronic or paper documents, including providing one or more of the following functions: copying, printing, scanning, and facsimile transmission. One embodiment of a business office appliance is a multi-function peripheral (MFP) device. As an increasing number of businesses expand into new markets while becoming more decentralized, the number of business office appliances deployed has similarly increased. Many business office appliances operate as network devices, often behind a firewall.

In addition to the obvious security advantages obtained through operating a business office appliance behind a firewall, there are some hidden, albeit large, disadvantages. Installation of software patches or software upgrades, or even retrieval of internal service log entries, requires a visit by a technician. Such visits create both a service disruption and increased operation costs such as downtime that ultimately are borne by users.

Based on the foregoing, there is a need for an approach of deployment of remote patches to one or more business office appliances operating behind a firewall.

SUMMARY

Software configuration and status information of one or more business office appliances operating behind a firewall are controlled remotely by a software patch management application and a device management application that communicate over a network. The software patch management application transmits instructions and software patches to a network. These instructions and software patches are retrieved by a proxy server located on the other side of the firewall and forwarded to the device management application. The device management application receives the instructions and/or software patches and communicates the instructions and/or software patches to one or more business office appliances for execution and/or installation. Each business office appliance performs the execution and/or installation concurrently with its normal operating processes.

BRIEF DESCRIPTION OF THE DRAWINGS

In the figures of the accompanying drawings, like reference numerals refer to similar elements.

DETAILED DESCRIPTION

A. Overview

Software configuration and status information of one or more business office appliances operating behind a firewall are controlled remotely by a software patch management application and a device management application that communicate over a network. The software patch management application transmits instructions and software patches to a network. These instructions and software patches are retrieved by a proxy server located on the other side of the firewall and forwarded to the device management application. The device management application receives the instructions and/or software patches and communicates the instructions and/or software patches to one or more business office appliances for execution and/or installation. Each business office appliance performs the execution and/or installation concurrently with its normal operating processes.

An embodiment of the invention comprises: a software patch management application generating a software update request and causing the software update request to be transmitted over a first network and stored on a server to allow a proxy server to retrieve the software update request from the server via a firewall and translating the software update request, if necessary, by a device commands communicator; and transmitting the software update request to a device management application via a second network that is different than the first network.

B. Configuration of the Patch Management System

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
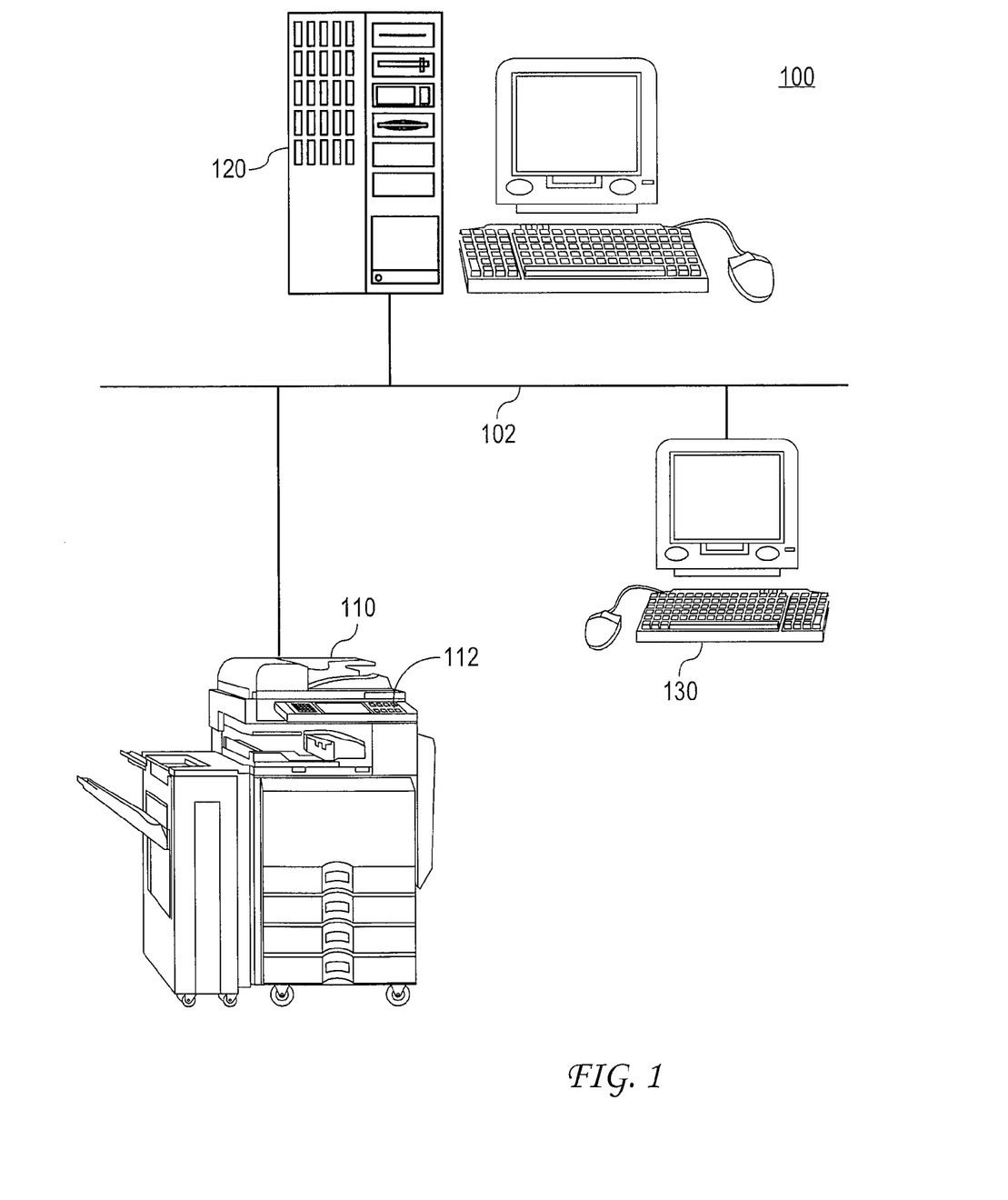
FIG. 1 is a block diagram of a multi-function peripheral connected to a network.

FIG. 1 depicts system 100 in which a business office appliance (in this instance, an MFP) 110 is connected to a network 102 to which an administrative computer 120 and a user computer 130 are connected. MFP 110 typically provides functions for copying, printing, scanning and facsimile transmission of documents. User access to MFP 110 is provided by a user interface 112 on MFP 110. In an embodiment, user access to MFP 110 is provided by user computer 130. Network 102 is internal and separated from external networks by a firewall (not shown). Access to internal data, such as MFP software and log files, residing on MFP 110 may be obtained through MFP 110, and optionally through administrative computer 120 or user computer 130. However, such access is limited to network 102, and cannot be made through the firewall.

Figure 2:
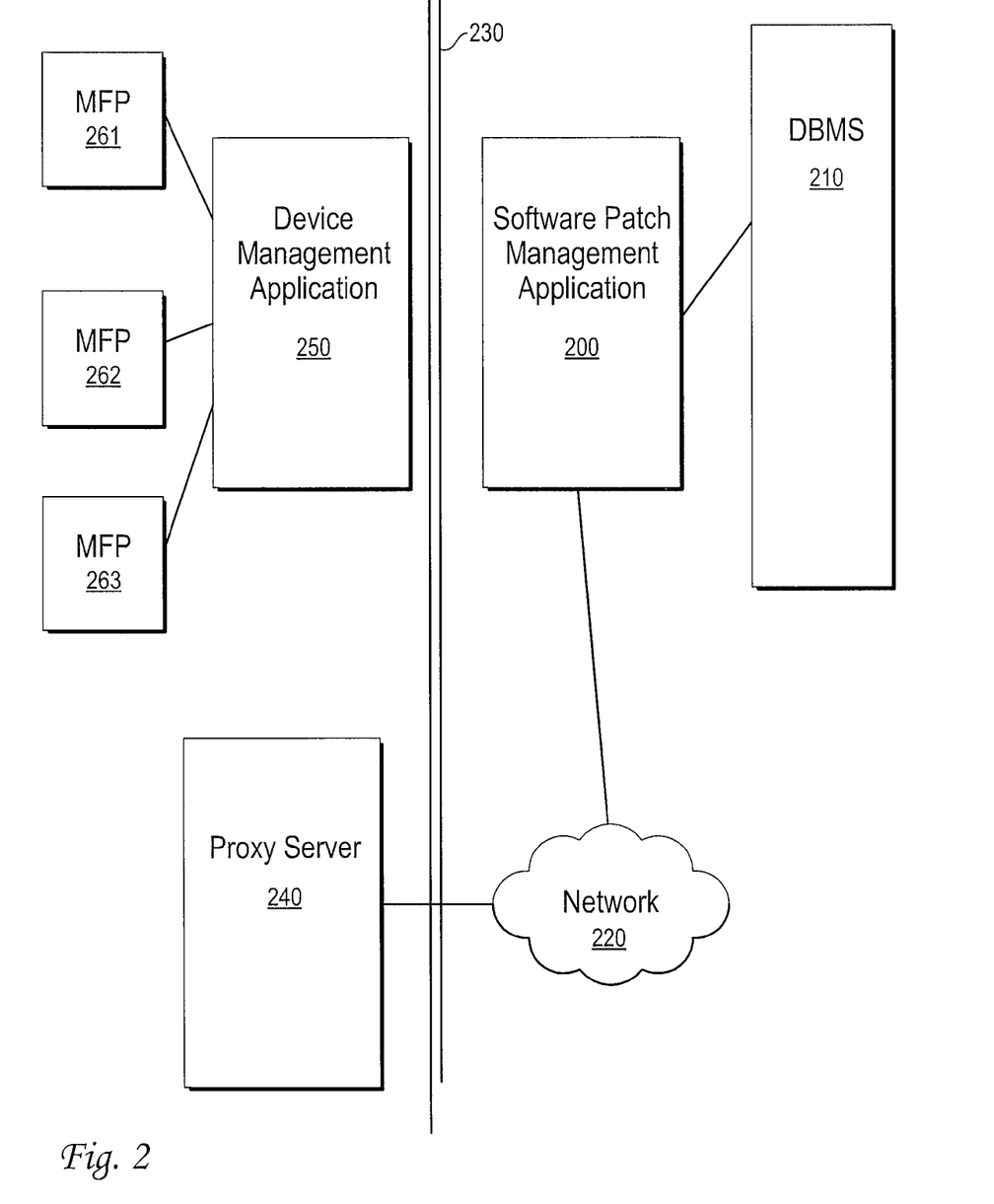
FIG. 2 is a block diagram of the hardware and software components of the software patch management system connected to a network and passing through a firewall.

FIG. 2 is block diagram of example hardware and software components of a patch management system connected to a network and passing through a firewall. A software patch management application 200 is connected to both a database management system (DBMS) 210 and a network 220. Software patch management application 200 operates on a networked computer (not shown), for example, a personal computer. DBMS 210 is implemented using a relational database. In an embodiment, DBMS 210 is implemented using MySQL 5.0. Network 220 is a conventional wired or wireless network that is either connection-less or uses connection-based sockets. In an embodiment, network 220 is an Ethernet wide-area network using Internet standard protocol.

Firewall 230 permits limited data transfer between network 220 and proxy server 240. Firewall 230 may be implemented in hardware, software, or any combination thereof. Firewall 230 may perform packet filtering, may operate as an application layer firewall, and may act as proxy device. However, firewall 230 permits retrieval by proxy server 240 of electronic mail messages located on network 220, and vice versa. For example, retrieval may be performed using Post Office Protocol version 3 (POP3), Internet Message Access Protocol version 4 (IMAP4), Simple Object Access Protocol (SOAP), Hypertext Transfer Protocol (http), or File Transfer Protocol (ftp). Although embodiments of the invention are described herein in the context of electronic mail messages, the invention is not limited to this context and is applicable to any type of electronic messages, such as messages transmitted using instant messaging.

Proxy server 240 is connected to a device management application 250. As described below with reference to FIG. 6, an embodiment of device management application 250 comprises a converter interface 610 and a device commands communicator 620. Device management application 250 receives electronic mail messages originating at software patch management application 200 that travel to network 220 and are retrieved by proxy server 240. Use of proxy server 240 permits communications by the patch management system through firewall 230 that otherwise would be blocked, while retaining the desirable features of firewall 230 that are useful in a business environment. Electronic mail messages retrieved by proxy server 240 are addressed to device management application 250.

Connected to device management application 250 are one or more business office appliances; FIG. 2 depicts MFP 261, MFP 262, and MFP 263, although in operation any number of business office appliances may be connected to device management application 250. From an administrator's perspective, MFP 261, 262 and 263 comprise a particular 'remote system' of business office appliances controlled by device management application 250; for example, the remote system depicted in FIG. 2 might be located at a particular corporate site.

While not depicted in FIG. 2, software patch management application 200 and network 220 may be configured to communicate to a multiplicity of proxy servers through a multiplicity of firewalls, thus permitting a single software patch management application 200 to service an essentially unlimited number of business office appliances connected to any number of separate networks.

Figure 6:
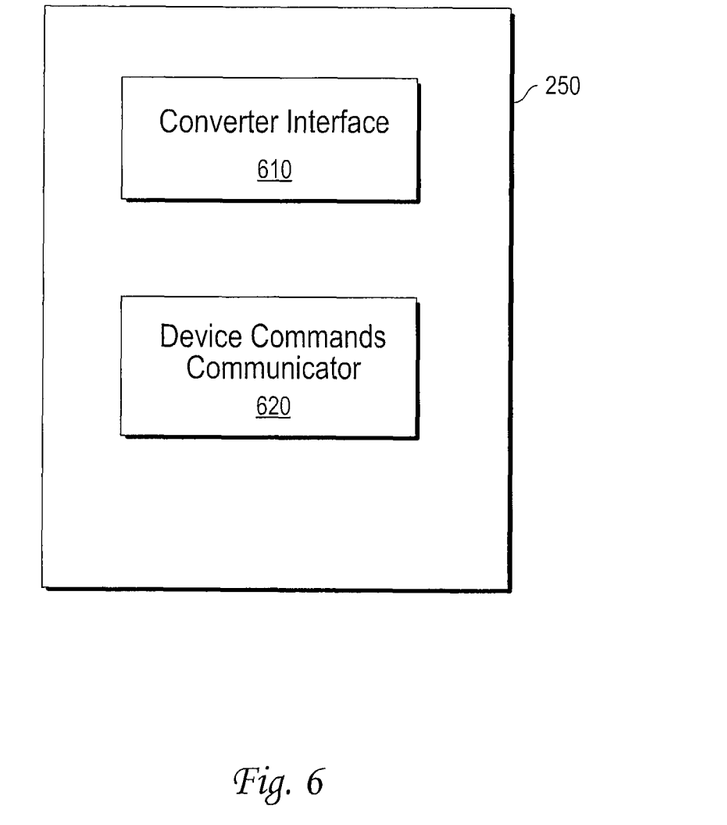
FIG. 6 is a block diagram is a block diagram that depicts a device management application.

Illustrated in FIG. 6 are components of device management application 250. Converter interface 610 is configured to convert, if necessary, electronic mail messages into device commands that are then executed by device commands communicator 620 on one or more of MFP 261, 262, and 263. Converter interface 610 is further configured to convert, if necessary, electronic mail messages into software patches that are then installed on one or more of MFP 261, 262, and 263 by device commands communicator 620. Device commands communicator 620 is further configured to receive device status and log files from one or more of MFP 261, 262, and 263 and forward the device status and log files to converter interface 610 for conversion, if necessary, into electronic mail messages for transmission back to software patch management application 200 via proxy server 240. Both software patch management application 200 and proxy server 240 are further described below with reference to FIGS. 3 and 4.

C. Initialization of the Software Patch Management Application

Figure 3:
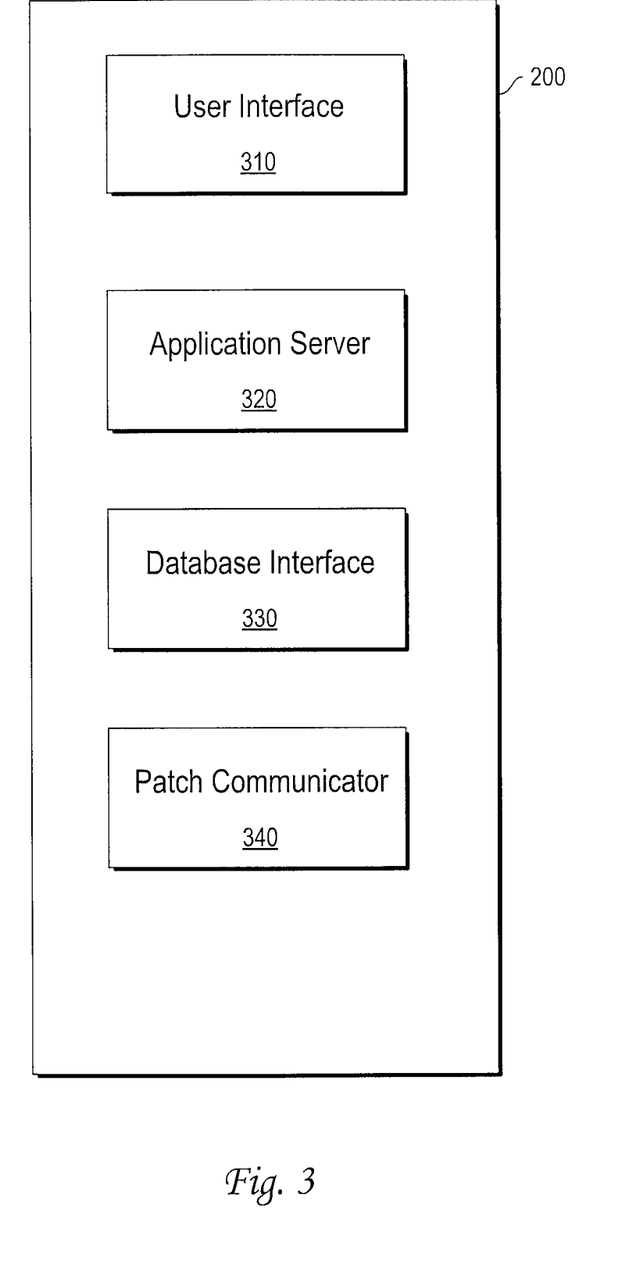
FIG. 3 is a block diagram that depicts a software patch management application.

FIG. 3 depicts an embodiment of software management patch application 200 having an administrator interface 310, an application server 320, a database interface 330, and a patch communicator 340. In actual use, software management patch application 200 need not comprise separate components corresponding to administrator interface 310, application server 320, database interface 330, and patch communicator 340; the particular embodiment depicted here is presented to illustrate the various functions that software management patch application 200 may perform.

Figure 4:
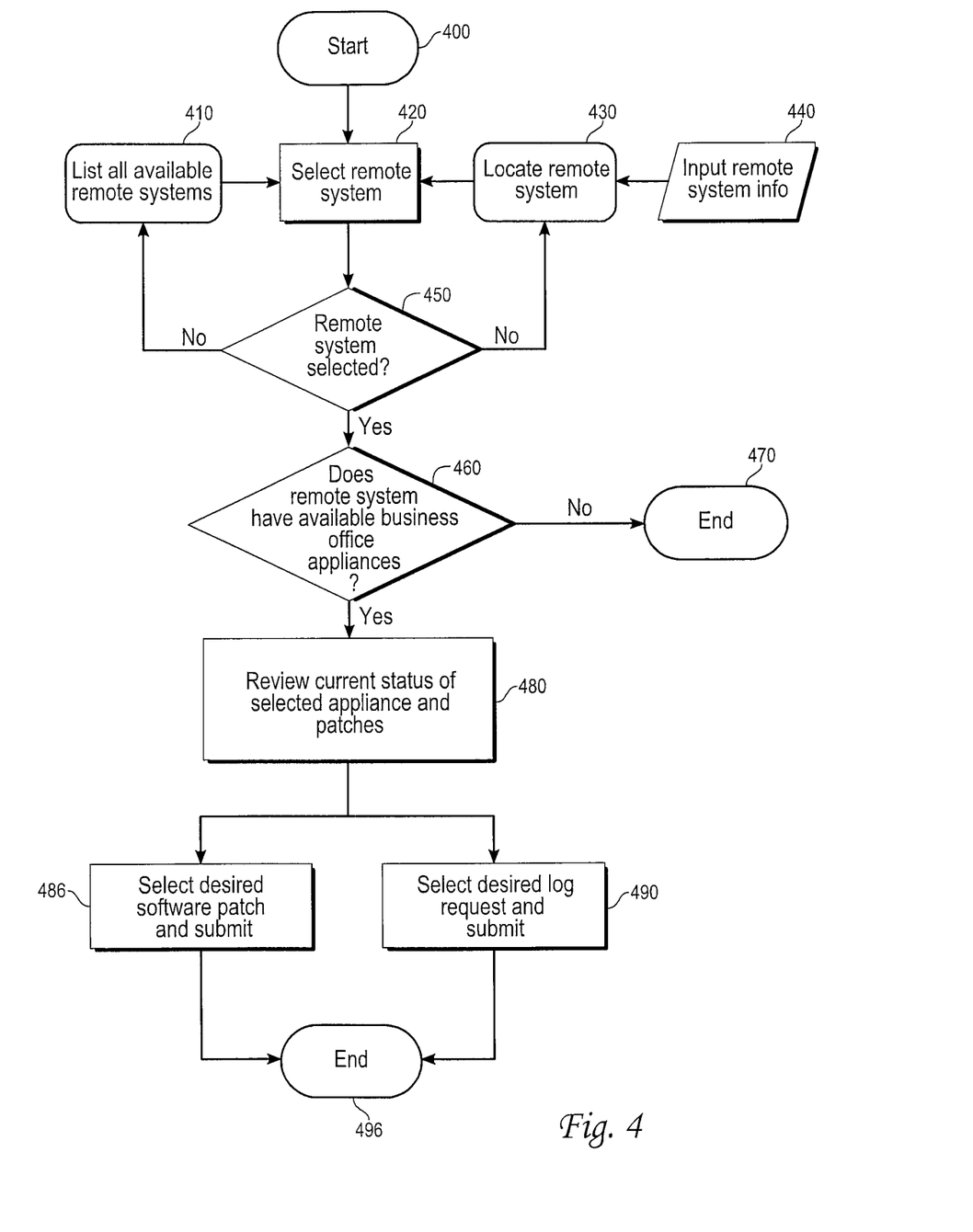
FIG. 4 is a flow diagram that depicts an approach for review and modification of software patch and log information.

The elements depicted in FIGS. 2-3 are described below first with respect to functions performed as part of the initialization process used to acquaint software patch management application 200 with MFPs 261-263 on the other side of firewall 230. These functions are represented in FIG. 4 at step 440.

In an embodiment, overall coordination of the functions of software management patch application 200 is provided by application server 320. In an embodiment, application server 320 is a J2EE Application Server. In an embodiment, administrator interface 310, database 330 and patch communicator 340 comprise applications dependent on application server 320.

Administrator interface 310 provides an interface from which to remotely review the status of one or more of MFP 261, 262, and 263, select appropriate software patches for transmission to one or more of MFP 261, 262, and 263, and retrieve and review log files from one or more of MFP 261, 262, and 263.

In an embodiment, administrator interface 310 is presented as an Internet Explorer webpage operating in Windows operating environment and written as JAVA servlets using JavaServer Pages (JSPs). Upon initial activation of administrator interface 310 by an administrator, the administrator is presented with one or more input screens used to input information regarding user name, password, host IP address and port of DBMS 210.

In an embodiment, administrator interface 310 then prompts the administrator to input incoming mail server information, such as user name, password, host IP address and port. Similarly, the administrator is prompted for outgoing mail server information, such as host IP address and port. This information is used to establish connections among software patch management application 200, DBMS 210, and network 220.

In an embodiment, administrator interface 310 then prompts the administrator to input one electronic mail address for each proxy server 240 connected both to a particular device management application 250 (or remote system) that manages a set of one or more MFPs and software patch management application 200. As previously explained, software patch management application 200 can be connected remotely to a plurality of device management applications each configured on a separate network.

Information input by the administrator regarding one or more MFPs managed by a particular device management application is used to initialize entries for the MFPs in DBMS 210 through database interface 330. Database interface 330 provides an interface, if necessary, for translation of administrator data input and commands into a format understandable by DBMS 210 and similarly translates, if necessary, data received from DBMS 210 either for review by the administrator or for control of or installation on an MFP.

While FIG. 2 depicts software patch management application 200 separate from DBMS 210 and connected to DBMS 210 via a connection such as, but not limited to: Ethernet, Wi-Fi, and Bluetooth, DBMS 210 may also reside on the computer on which software patch management application 200 resides.

With reference to FIG. 2, after the administrator initializes entries for MFP 261, MFP 262 and MFP 263 in DBMS 210, DBMS 210 may still use initial status information from MFP 261, MFP 262, and MFP 263 to provide a "baseline" set of information for future successful software patch delivery. In an embodiment, the administrator inputs initial status information.

In an embodiment, such initial status information from MFP 261, MFP 262, and MFP 263 is obtained automatically by DBMS 210 when DBMS 210 transmits initialization instructions to database interface 330. These instructions are then prepared by patch communicator 340 for transmission via electronic mail, for example, from network 220 to proxy server 240. Initialization instructions, and other instructions used to access or control an MFP, are described later below with reference to FIG. 4.

In an embodiment, patch communicator 340 formats initialization instructions as a file that is appended to an electronic mail message addressed to device management application 250 and containing one or more MFP destination identifiers, such as one corresponding to MFP 261. Electronic mail communications are managed by application server 320.

D. Operation of the Software Patch Management Application

Figure 5:
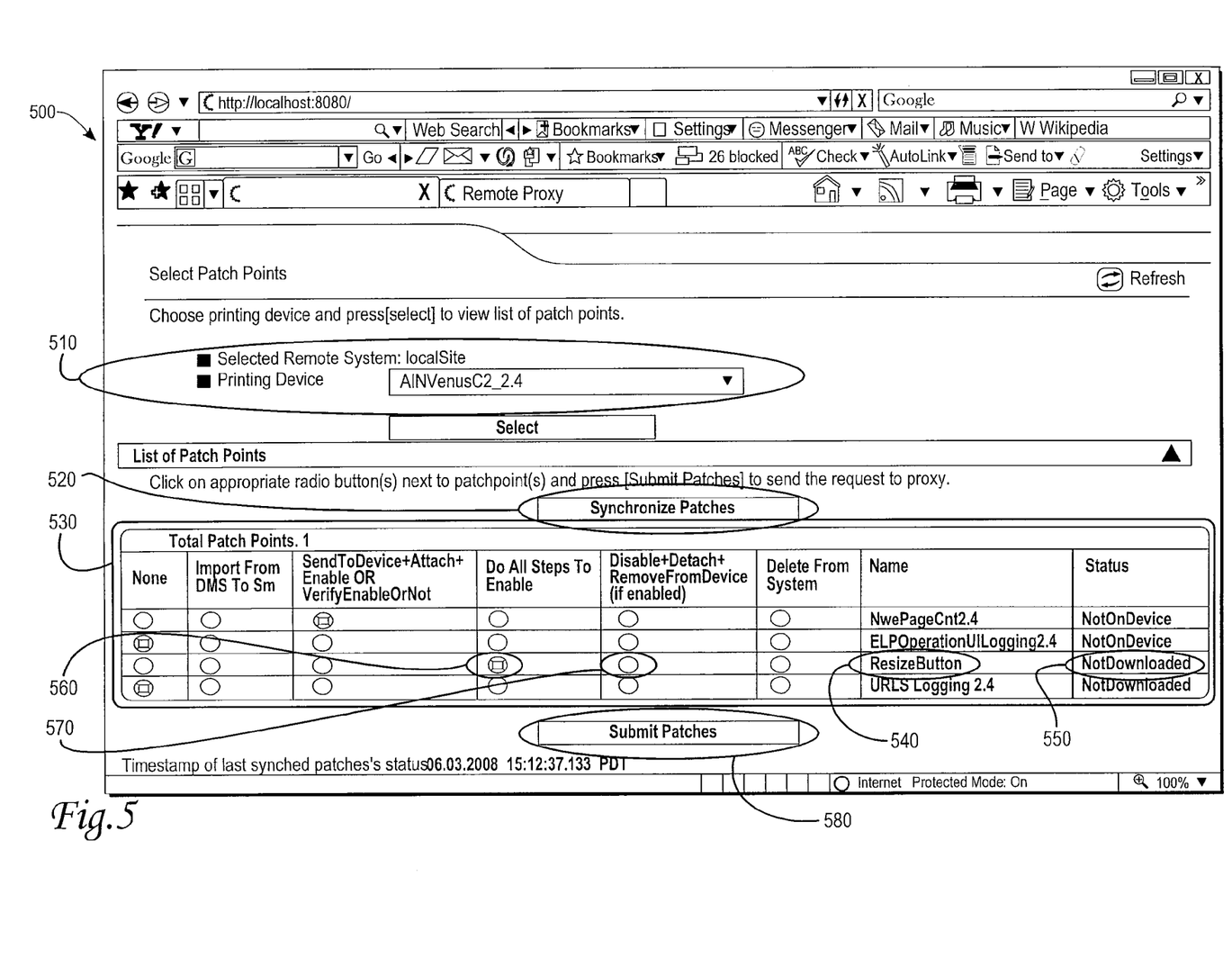
FIG. 5 depicts an administrator user interface in the form of a webpage.

Once initialized, typical operation of software patch management application 200 begins when the administrator accesses software patch management application 200 through administrator interface 310. FIG. 4 illustrates a flowchart of steps performed by the administrator during operation. A portion of a sample administrator interface is illustrated in FIG. 5 and described following the explanation of FIG. 4.

This illustration presupposes the administrator has already performed the proper initialization, described above and corresponding on FIG. 4 to step 440. The administrator selects a particular remote system for review through administrator interface 310. Information regarding the current status of remote systems managed by software patch management application 200 can be accessed via DBMS 210, or optionally through status commends sent to device management application 250. This information is acquired in steps 410 and 430.

Any combination of steps 410, 420, 430 and 440 may be performed until the administrator has settled upon a remote system for which software patch management or review of log files is desired, corresponding to step 450. In step 460, should the remote system have no available business office appliances for modification or review, the process is terminated at step 470.

Should the administrator select a remote system having available business office appliances in step 460, the administrator is presented with a complete listing of available business office appliances from which the administrator may view the current status of a selected business office appliance, in step 480. In an embodiment, administrator interface 310 presents the status of all software patches relevant to the selected business office appliance.

In step 486, the administrator may configure commands to: (1) import software patches from DBMS 210 into software patch management application 200, (2) send one or more software patches from software patch management application 200 to a selected business office appliance, (3) activate one or more software patches residing at a selected business office appliance, (4) disable one or more software patches currently enabled at a selected business office appliance, and (5) delete one or more software patches currently residing at a selected business office appliance.

Alternatively (or in addition to performing step 486), at step 490 the administrator may also query a selected business office appliance for its log files via administrator interface 310. Upon activation of this command, an electronic mail message containing commands to directing the business office appliance to send its log files is dispatched by application server 320 for processing by proxy server 240.

In an embodiment, the administrator may also synchronize the set of software patches residing at a selected business office appliance with the corresponding set indicated by DBMS 210.

After the administrator has performed one or both of: (1) configuring all software patch commands followed by activation of the "submit" command at step 486, and (2) selecting a desired log file for review followed by activation of the "submit" command at step 490, the relevant data is fetched from DBMS 210 by database interface 330, the data is encoded in one or more electronic mail messages by patch communicator 340, and dispatched by application server 320 for processing by proxy server 240.

FIG. 5 depicts a portion of an embodiment of administrator interface 310, presented to the administrator as a webpage 500. Selection area 510 displays information regarding a selected business office appliance as part of selected remote system (here for example, MFP 261, named "AINVenusC2_2.4" that is part of selected remote system named "localSite" in webpage 500), and allows re-selection, if desired.

Activation of synchronize button 520 effects synchronization between applicable software patches (referred to in webpage 500 as "patches" or "patch points") residing on either database 330 or the selected business office appliance.

Following synchronization, status area 530, displays status information regarding patch points applicable to the selected business office appliance AINVenusC2_2.4. For example, patch name 540 refers to the "ResizeButton" patch having a current status 550 of "NotDownloaded," indicating the ResizeButton patch currently resides in database 330 and has not been downloaded to AINVenusC2_2.4.

The first six columns in status area 530 display radio button selections permitting the administrator to reconfigure the status of the patch points. Radio button selections are 'context aware,' meaning that for a given patch, the radio button selections available may depend on the current status of the patch, For example, button 560 is selected corresponding to the action "Do All Steps to Enable," which, following activation of submit button 580, would: (1) cause the transmission of the ResizeButton patch to device management application 250; (2) further cause the transmission of the ResizeButton patch to the selected business office appliance; and (3) finally cause the execution of the ResizeButton patch on the selected business office appliance. However, in this example, the administrator would not be presented the option of activating radio button 570 corresponding to the action "Disable+Detach+ RemoveFromDevice (if Enabled)" because the ResizeButton patch is not currently enabled or attached to the selected business office appliance.

The software patch deployment methods will now be described in more detail regarding operations occurring inside the firewall where the actual business office appliances are operating.

E. Operation of the Device Management Application

FIG. 6 depicts device management application 250 having converter interface 610 and device commands communicator 620. However, device management application 250 need not comprise a component separate from proxy server 240 as depicted in FIG. 2; the particular embodiment here is presented to illustrate the various functions device management application 250 can be expected to perform. In an embodiment, proxy server 240 operates using Apache Tomcat.

Electronic mail messages fetched by proxy server 240 containing software patches are converted, if necessary, by converter interface 610 into a format suitable for installation on each MFP. The software patches are then submitted to each business office appliance by device commands communicator 620 and subsequently installed on each business office appliance. In an embodiment, device commands communicator 620 includes remote debugging software. One example of remote debugging software is Field Diagnostics, produced by Wind River Systems, that permits access to selected portions of the memory of MFP 110. Techniques for modification of information resident on a business office appliance are further described in application Ser. No. 12/141,705, "Approach for Updating Usage Information on Printing Devices," filed on Jun. 18, 2008, which is assigned to the assignee of this application and incorporated by reference.

Converter interface 610 takes instructions encoded in the electronic mail message fetched by proxy server 240, and if necessary, converts the instructions into a format executable by the destination business office appliance. In an embodiment, such instructions modify the operation of the destination business office appliance; for example, the instructions could change the user interface on the MFP. Device commands communicator 620 then transfers these instructions during normal operation of the business office appliance, effecting the change without requiring re-boot of the business office appliance.

In an embodiment, the instructions encoded in the electronic mail message seek status data, such as log files, from the business office appliance. After device commands communicator 620 transfers these instructions to the business office appliance, device commands communicator 620 waits for transmission of the status data from the business office appliance. The received status data is converted by converter interface 610, if necessary, into a format suitable for transmission as an attachment to an electronic mail message, and forwarded to proxy server 240 as an electronic message for delivery to software patch management application 200 via network 220.

F. Results of Operation

Figure 7:
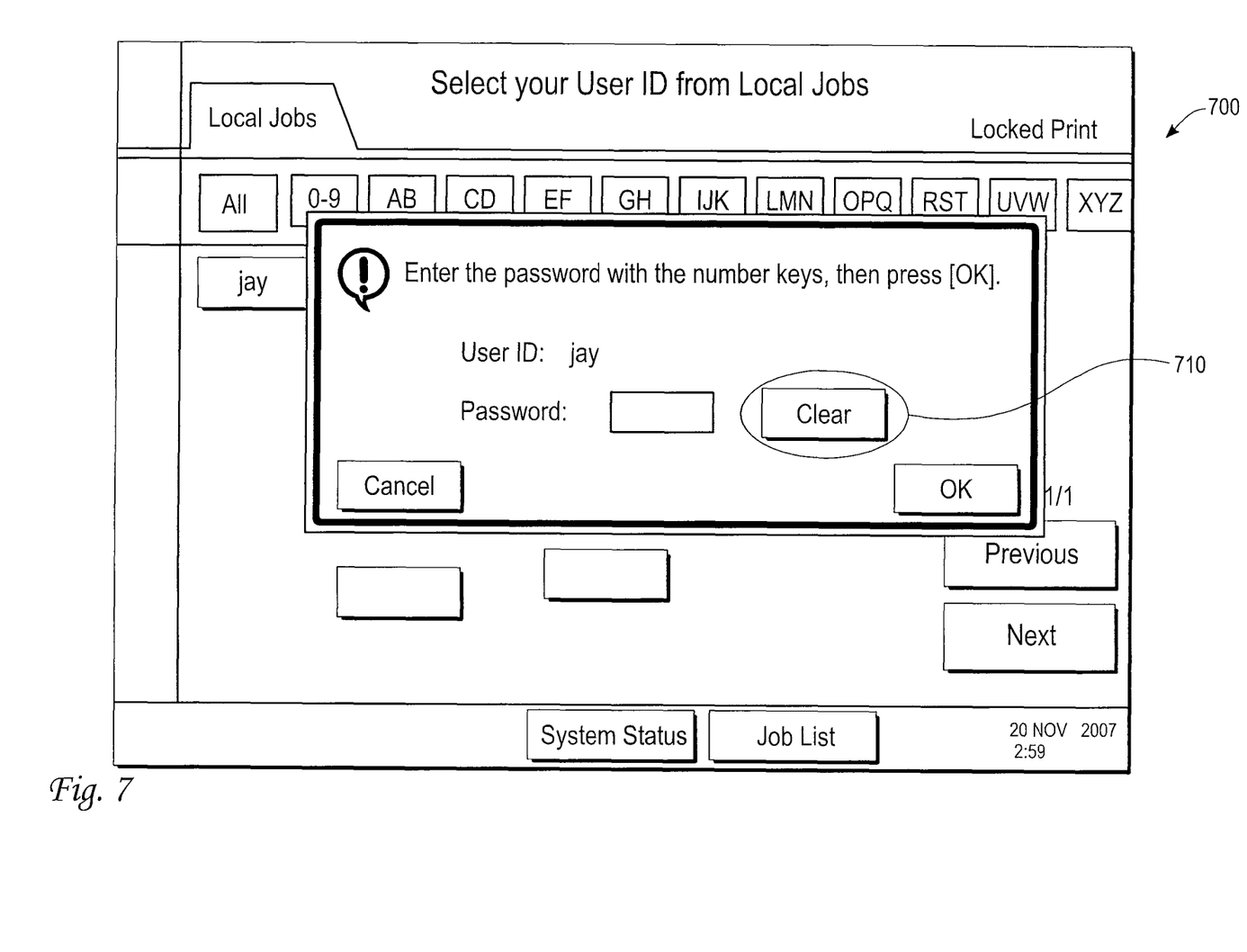
FIG. 7 depicts a user interface of an MFP prior to installation of a software patch.
Figure 8:
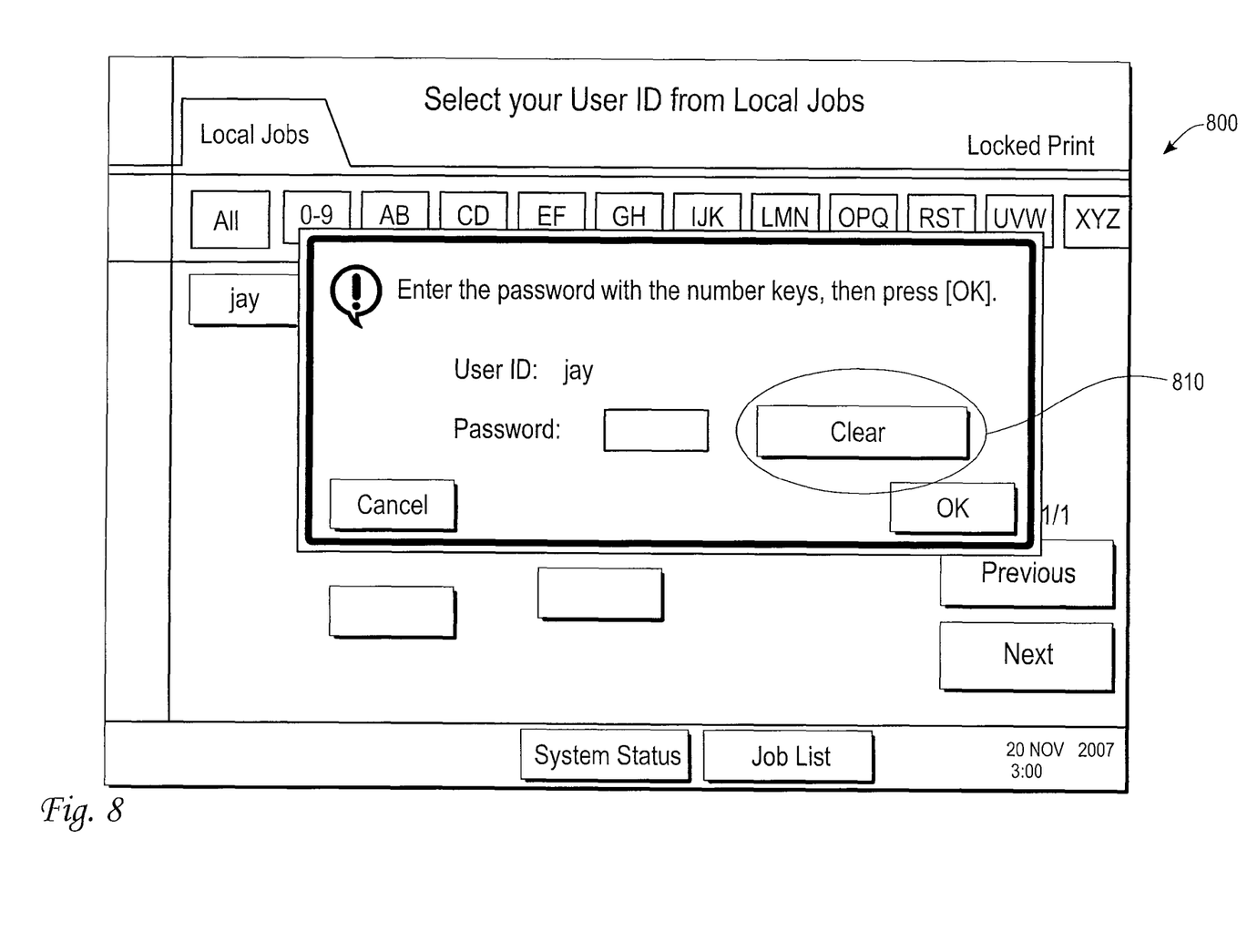
FIG. 8 depicts the user interface of the MFP after installation of the software patch.

Sample results of operation of an embodiment are depicted in FIGS. 7-8. FIG. 7 depicts a user interface 700 displayed on an MFP operating in a network behind a firewall, prior to installation of a software patch. Clear button 710 appears in user interface 700 at a default size. With reference to FIG. 5, the administrator has configured webpage 500 as illustrated and is poised to activate submit button 580 and cause the ResizeButton patch to be enabled on the MFP currently displaying user interface 700 and clear button 710. In this example, the ResizeButton patch corresponds to software which when installed will enlarge the size of clear button 710 for added visibility and ease-of-use, such as to assist a sight-impaired user with use of the MFP.

Shortly after the administrator activates submit button 580, the ResizeButton patch is enabled on the MFP, with results depicted in FIG. 8. User interface 800 appears similar to user interface 700, with clear button 810 now noticeably larger in size. Thus the administrator, operating remotely from the other side of a firewall, was able to reconfigure an MFP without requiring either (1) a re-boot of the MFP, or (2) any manual intervention by users physically located at the site of the MFP. This example is not intended to be limiting, as there are few, if any, limits on the software patches deliverable in this manner. In another example, the software patch could reconfigure a user interface to calculate and display copying costs based on the type and size of copying job to be performed by a user.

G. Computing Platforms

Figure 9:
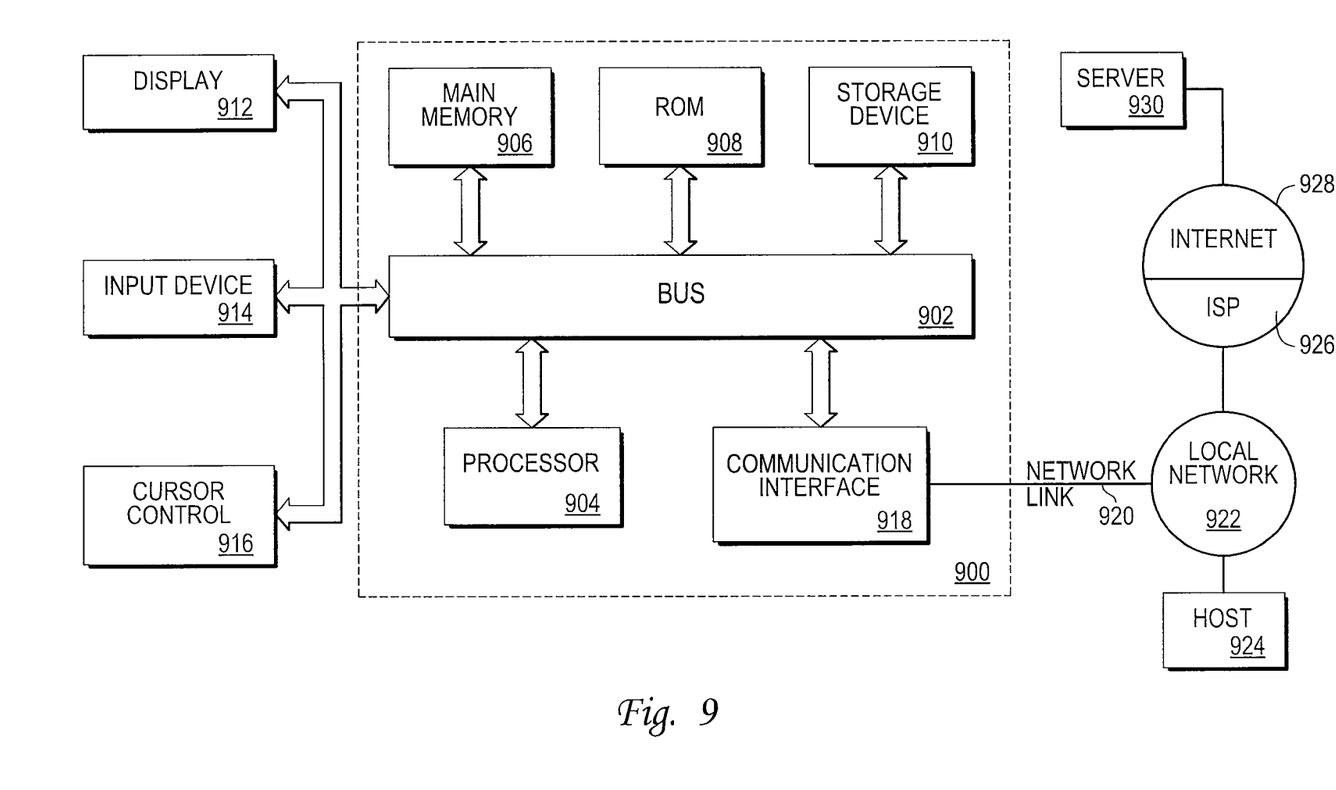
FIG. 9 is a block diagram of a computer system on which embodiments of the invention may be implemented.

The approach described herein for managing usage information may be implemented on any type of computing platform or architecture. For purposes of explanation, FIG. 9 is a block diagram that depicts an example computer system 900 upon which embodiments of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 900, various computer-readable media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
a software patch management application located on a first side of a firewall, the software patch management application being configured to:
generate a software update request identifying at least a particular business office appliance and
cause the software update request to be transmitted over a first network and stored on a server located on the first side of the firewall to allow a proxy server located on a second side of the firewall that is different than the first side of the firewall to retrieve the software update request from the server via the firewall and to transmit the software update request to a device management application residing on a second network that is different than the first network and located on the second side of the firewall;
the device management application being configured to:
receive the software update request from the proxy server,
select the particular business office appliance from a plurality of business office appliances located on the second side of the firewall based at least in part on the software update request,
invoke a device commands communicator to generate one or more instructions based at least in part on the software update request, and
cause the one or more instructions to be processed on the particular business office appliance.

2. The system of claim 1, wherein the software update request comprises a software patch installation.

3. The system of claim 1, wherein the server is one or more of:
an email server;
an ftp server; or
a web server.

4. The system of claim 1 wherein the software patch management application generates the software update request in response to receiving a selection of one or more business office appliances and wherein the particular business office appliance is a member of the one or more business office appliances.

5. The system of claim 1 wherein the software patch management application receives information regarding the patch status of the particular business office appliance.

6. The system of claim 1, wherein the device management application is configured to receive the software update request directly from the proxy server.

7. A computer-implemented method comprising:
generating, by a software patch management application located on a first side of a firewall, a software update request identifying at least a particular business office appliance;
causing, by the software patch management application, the software update request to be transmitted over a first network and stored on a server located on the first side of the firewall to allow a proxy server located on a second side of the firewall that is different than the first side of the firewall to retrieve the software update request from the server via the firewall and to transmit the software update request to a device management application residing on a second network that is different than the first network and located on the second side of the firewall;
receiving, by the device management application, the software update request from the proxy server;
selecting, by the device management application, the particular business office from a plurality of business office appliances located on the second side of the firewall based at least in part on the software update request;
invoking, by the device management application, a device commands communicator to generate one or more instructions based at least in part on the software update request, and
causing, by the device management application, the one or more instructions to be processed on the particular business office appliance.

8. The computer-implemented method of claim 7, wherein the software update request comprises a software patch installation.

9. The computer-implemented method of claim 7, wherein the server is one or more of:
an email server;
an ftp server; or
a web server.

10. The computer-implemented method of claim 7, wherein the processing of the software update request occurs concurrently with one or more processes executing on the particular business office appliance.

11. The computer-implemented method of claim 7, wherein the software patch management application generates the software update request in response to receiving a selection of one or more business office appliances and wherein the particular business office appliance is a member of the one or more business office appliances.

12. The computer-implemented method of claim 7, wherein the software patch management application receives information regarding the patch status of the particular business office appliance.

13. The computer-implemented method of claim 7, wherein the device management application is configured to receive the software update request directly from the proxy server.

14. A non-transitory computer-readable storage medium storing instructions which when executed by one or more processors causes:
generating, by a software patch management application located on a first side of a firewall, a software update request identifying at least a particular business office appliance;
causing, by the software patch management application, the software update request to be transmitted over a first network and stored on a server located on the first side of the firewall to allow a proxy server located on a second side of the firewall that is different than the first side of the firewall to retrieve the software update request from the server via the firewall and to transmit the software update request to a device management application residing on a second network that is different than the first network and located on the second side of the firewall;
receiving, by the device management application, the software update request from the proxy server;
selecting, by the device management application, the particular business office from a plurality of business office appliances located on the second side of the firewall based at least in part on the software update request;
invoking, by the device management application, a device commands communicator to generate one or more instructions based at least in part on the software update request, and
causing, by the device management application, the one or more instructions to be processed on the particular business office appliance.

15. The non-transitory computer-readable storage medium of claim 14, wherein the software update request comprises a software patch installation.

16. The non-transitory computer-readable storage medium of claim 14, wherein the server is one or more of:
an email server;
an ftp server; or
a web server.

17. The non-transitory computer-readable storage medium of claim 14, wherein the processing of the software update request occurs concurrently with one or more processes executing on the particular business office appliance.

18. The non-transitory computer-readable storage medium of claim 14, wherein the software patch management application generates the software update request in response to receiving a selection of one or more business office appliances and wherein the particular business office appliance is a member of the one or more business office appliances.

19. The non-transitory computer-readable storage medium of claim 14, wherein the software patch management application receives information regarding the patch status of the particular business office appliance.

20. The non-transitory computer-readable storage medium of claim 14, wherein the device management application is configured to receive the software update request directly from the proxy server.

* * * * *